(12) United States Patent  (10) Patent No.: US 8,447,131 B2
Sakashita  (45) Date of Patent: May 21, 2013

(54) IMAGE PROCESSING APPARATUS AND IMAGE PROCESSING METHOD

(75) Inventor: Yukihiko Sakashita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 126 days.

(21) Appl. No.: 12/829,538

(22) Filed: Jul. 2, 2010

(65) Prior Publication Data

US 2011/0081095 A1 Apr. 7, 2011

(30) Foreign Application Priority Data

Oct. 6, 2009 (JP) ................................. 2009-232864

(51) Int. Cl.
*G06K 9/40* (2006.01)
*G06K 9/32* (2006.01)
*H04N 7/01* (2006.01)

(52) U.S. Cl.
USPC ........... 382/263; 382/260; 382/264; 382/300; 348/441

(58) Field of Classification Search .................. 382/165, 382/167, 190, 199, 219, 220, 250, 251–252, 382/255–256, 260–266; 348/607, 610, 615, 348/622, 625, 627, 441; 358/3.26, 3.27, 532, 358/537, 540, 463, 464
See application file for complete search history.

(56) References Cited

U.S. PATENT DOCUMENTS

| 5,050,223 | A * | 9/1991 | Sumi ............................. 382/266 |
| 6,501,451 | B1 | 12/2002 | Sakashita |
| 6,965,416 | B2 * | 11/2005 | Tsuchiya et al. .............. 348/606 |
| 7,542,619 | B2 | 6/2009 | Toyooka et al. |
| 7,606,415 | B2 * | 10/2009 | Ogata et al. ................... 382/167 |
| 8,077,258 | B2 | 12/2011 | Take et al. |
| 2003/0038768 | A1 | 2/2003 | Sakashita |
| 2004/0051794 | A1 * | 3/2004 | Horita ........................... 348/234 |

(Continued)

FOREIGN PATENT DOCUMENTS

| CN | 1953508 A | 4/2007 |
| CN | 101071548 A | 11/2007 |

(Continued)

OTHER PUBLICATIONS

Chinese Office Action dated Nov. 12, 2012, in counterpart Chinese Application No. 201010504268.0, and English-language translation thereof.

*Primary Examiner* — Andrae S Allison

(74) *Attorney, Agent, or Firm* — Fitzpatrick, Cella, Harper & Scinto

(57) ABSTRACT

A characteristic image detection interpolation unit performs interpolation processing for increasing the luminance value in low-luminance area which is partly present in an input image. A minimum value filter unit executes minimum value filter processing on an image subjected to the interpolation processing, and a low-pass filter performs low-pass filter processing on the image subjected to the minimum value filter processing, thereby generating a low-frequency component image. A subtracter generates a high-frequency component image by subtracting the low-frequency component image from the input image. A coefficient multiplier adds the luminance value of the high-frequency component image to the input image by a preset ratio K1, thereby generating a high-frequency component enhanced image. A selector alternately outputs the low-frequency component image and the high-frequency component enhanced image.

5 Claims, 6 Drawing Sheets

U.S. PATENT DOCUMENTS

| | | | |
|---|---|---|---|
| 2004/0202377 A1* | 10/2004 | Murakami | 382/251 |
| 2004/0246537 A1* | 12/2004 | Ohyama et al. | 358/479 |
| 2007/0085930 A1 | 4/2007 | Kobayashi et al. | |
| 2007/0263121 A1 | 11/2007 | Take et al. | |
| 2008/0063048 A1 | 3/2008 | Ouchi et al. | |
| 2008/0298710 A1* | 12/2008 | Watanabe | 382/264 |
| 2009/0080769 A1* | 3/2009 | Kagawa et al. | 382/162 |
| 2009/0207186 A1 | 8/2009 | Toyooka et al. | |
| 2009/0309890 A1 | 12/2009 | Mizuno et al. | |
| 2009/0322941 A1* | 12/2009 | Hatanaka | 348/448 |
| 2012/0242903 A1 | 9/2012 | Kobayashi et al. | |

FOREIGN PATENT DOCUMENTS

| | | |
|---|---|---|
| JP | 11-126050 A | 5/1999 |
| JP | 2002-351382 A | 12/2002 |
| JP | 2006-184896 A | 7/2006 |
| TW | 2007-14033 A | 4/2007 |

* cited by examiner

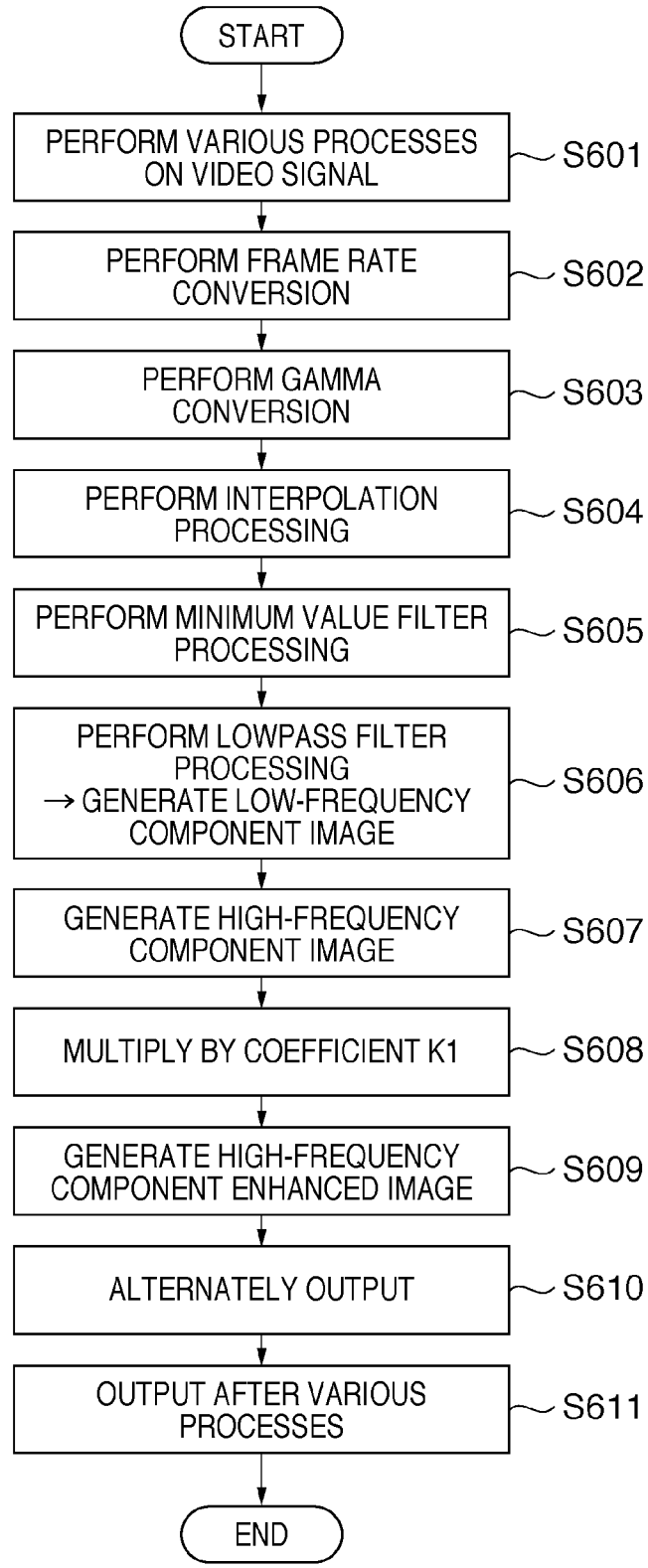

IMAGE PROCESSING APPARATUS AND IMAGE PROCESSING METHOD

BACKGROUND OF THE INVENTION

1. Field of the Invention

The present invention relates to an image processing technique.

2. Description of the Related Art

In recent years, a liquid-crystal display device has been used as a television receiver or a display device for a PC. Such a liquid-crystal display device has been widely used because it can be formed thin and saves space and power. In such a liquid-crystal display device, however, the response time for motion video is long.

As a driving method for a liquid-crystal display device to improve the response time, there has been provided a method of comparing image data to be displayed next with previous image data, and performing overdrive in accordance with the comparison result (Japanese Patent Laid-Open No. 11-126050).

As a method of improving motion blurring due to the display characteristics of a liquid-crystal display device, there has been proposed a method of driving the display device by doubling the frame frequency of an input image signal, and by inserting a black image or an intermediate image (Japanese Patent Laid-Open No. 2002-351382).

Furthermore, the following technique has been proposed (Japanese Patent Laid-Open No. 2006-184896). One frame is divided into a plurality of subframes by raising the frame frequency of an input image signal. High-frequency components of an image signal used to display an image in at least one predetermined subframe of the plurality of subframes are decreased as compared with image signals used to display images in other subframes.

If the change amount of the high-frequency components is large, however, a value exceeding a display range may be generated, thereby disturbing the display image or displaying an extra video. If this problem is addressed by decreasing the high-frequency components, the motion blurring improvement effect decreases (deteriorates).

SUMMARY OF THE INVENTION

The present invention has been made in consideration of the above problems, and provides a technique for allowing a display taking full advantage of the dynamic range of display tones without losing high-frequency components, and for suppressing extra pseudo components.

According to a first aspect of the present invention, an image processing apparatus comprises:

a correction unit which increases a luminance value in a low-luminance area that is partly present in an input image;

a filter unit which generates a low-frequency component image by executing minimum value filter processing on an image corrected by the correction unit and then performing low-pass filter processing on the image subjected to the minimum value filter processing;

a unit which generates a high-frequency component image by subtracting the low-frequency component image from the input image;

an unit which generates a high-frequency component enhanced image by adding a luminance value of the high-frequency component image to the input image according to a preset ratio; and an output unit which alternately outputs the low-frequency component image and the high-frequency component enhanced image.

According to a second aspect of the present invention, an image processing method comprises:

a correction step of increasing a luminance value in a low-luminance area which is partly present in an input image;

a filter step of generating a low-frequency component image by executing minimum value filter processing on an image corrected in the correction step and then performing low-pass filter processing on the image subjected to the minimum value filter processing;

a step of generating a high-frequency component image by subtracting the low-frequency component image from the input image;

a step of generating a high-frequency component enhanced image by adding a luminance value of the high-frequency component image to the input image according to a preset ratio; and an output step of alternately outputting the low-frequency component image and the high-frequency component enhanced image.

Further features of the present invention will become apparent from the following description of exemplary embodiments with reference to the attached drawings.

BRIEF DESCRIPTION OF THE DRAWINGS

FIG. 6 is a flowchart showing processing executed by the image processing apparatus 200.

DESCRIPTION OF THE EMBODIMENTS

Embodiments of the present invention will be described below with reference to the accompanying drawings. Note that the embodiments to be explained below are merely examples when the present invention is practically implemented, and are practical examples of an arrangement set forth in the following claims.

First Embodiment

Figure 1:
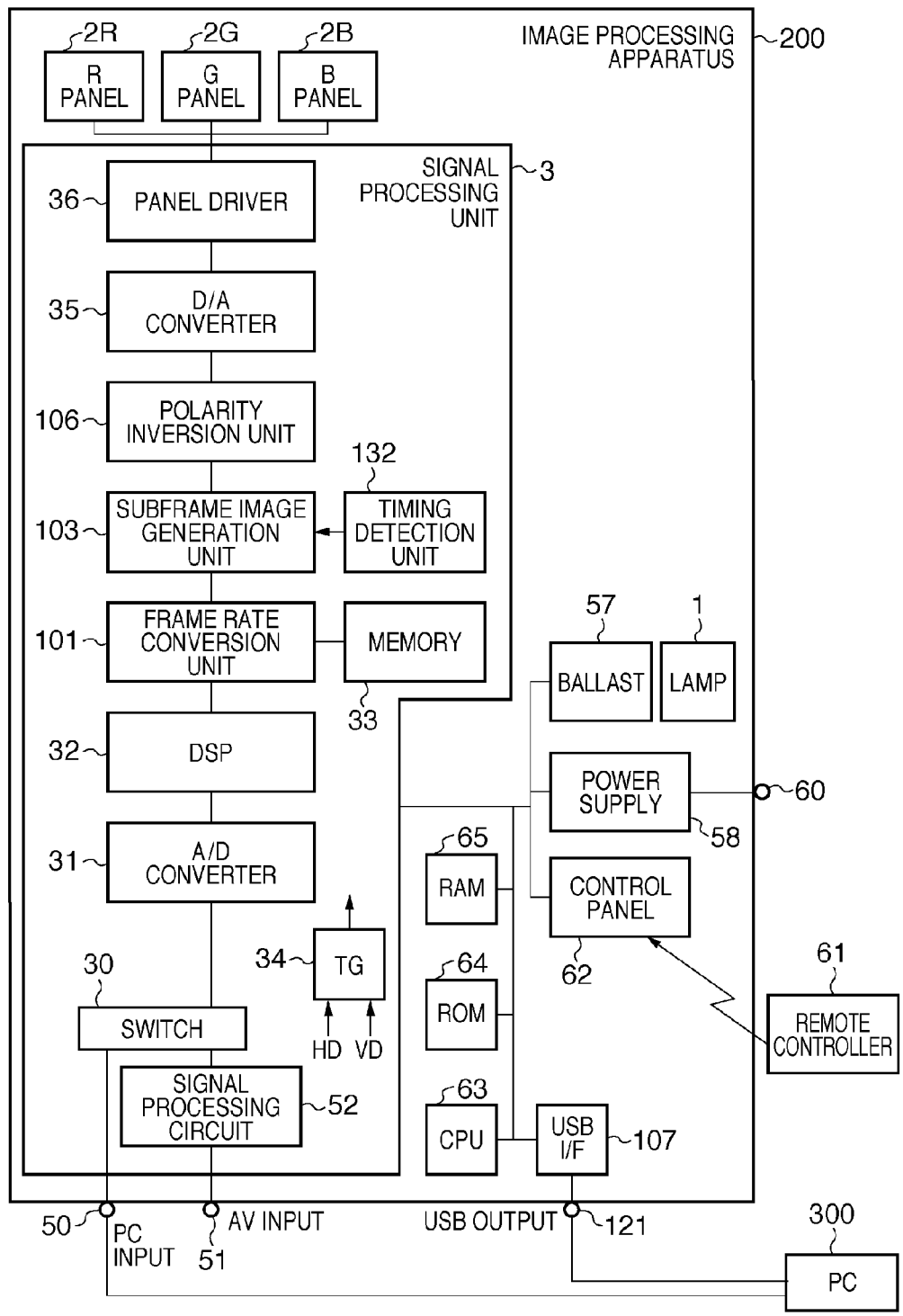
FIG. 1 is a block diagram showing an example of the functional arrangement of an image processing apparatus 200 according to the first embodiment.

With reference to FIG. 1, an image processing apparatus and its peripherals according to this embodiment will be described first. As shown in FIG. 1, an image processing apparatus 200 according to the embodiment connects with a PC (Personal Computer) 300, and can acquire a video signal as a display target from this PC 300. The image processing apparatus 200 has an AV terminal 51, and can externally receive, via the AV terminal 51, signals of various standards such as NTSC, and video signals of general TV broadcast programs. The image processing apparatus 200 can also receive, via the AV terminal 51, a video signal from, e.g., a recording device (video deck, DVD recorder, or HDD recorder) for recording a video signal on a medium, or a playback device (DVD player, LD player, or the like) for playing back a video signal recorded on a medium. As explained above, the image processing apparatus 200 can acquire a video signal in various input forms.

The image processing apparatus 200 will be described first. Signals of various standards, such as NTSC, video signals of general TV broadcast programs, and video signals output from a recording device such as a video deck, DVD recorder, or HDD recorder, or a playback device such as a DVD player or LD player are input to a signal processing circuit 52 via the AV terminal 51.

The signal processing circuit 52 performs signal processing such as decoding, noise reduction, bandwidth-limiting filtering, and signal level adjustment on the video signal input via the AV terminal 51. The signal processing circuit 52 sends the video signal subjected to the various signal processes to a subsequent switch 30.

In addition, a video signal transmitted from the PC 300 is input to the switch 30 via a terminal 50. The switch 30 then selects one of the video signals from the signal processing circuit 52 and the terminal 50, and sends the selected video signal to an A/D converter 31. The A/D converter 31 converts the video signal serving as an analog video signal sent from the switch 30 into a digital video signal.

A DSP (Digital Signal Processor) 32 performs image processing such as contrast adjustment, brightness control, color conversion, and resolution conversion on the digital video signal input from the A/D converter 31. The DSP 32 sends a resultant video signal to a subsequent frame rate conversion unit 101.

The frame rate conversion unit 101 converts the frame rate of the video signal input from the DSP 32. The frame rate conversion unit 101 stores the converted video signal as image data in a memory 33. The memory 33 is used for storing the image data of a current frame (image data to be displayed now) and that of the next frame (image data to be displayed in the next frame). Therefore, the frame rate conversion unit 101 sequentially sends the image data stored in the memory 33 to a subsequent subframe image generation unit 103 from the older data.

A timing generation circuit (TG) 34 outputs a timing signal which defines an operation timing of each unit of a signal processing unit 3 to the corresponding unit. The subframe image generation unit 103 performs, on the image data sent from the frame rate conversion unit 101, processing for improving a moving image characteristic such as motion blurring, thereby generating and outputting a low-frequency component image and a high-frequency component enhanced image (to be described later).

A timing detection unit 132 supplies, to the subframe image generation unit 103, a switching signal for causing the subframe image generation unit 103 to alternately output the low-frequency component image and the high-frequency component enhanced image. A polarity inversion unit 106 inverts the polarity of a video signal based on the image data output from the subframe image generation unit 103.

A D/A converter 35 converts the video signal serving as a digital video signal whose polarity has been inverted by the polarity inversion unit 106 into an analog video signal, and sends it to a subsequent panel driver 36.

Of the video signal received from the D/A converter 35, the panel driver 36 sends an R component signal to an R panel 2R, a G component signal to a G panel 2G, and a B component signal to a B panel 2B. The panel driver 36 also supplies power to the panels 2R, 2G, and 2B. The above-described units constitute the signal processing unit 3.

Each panel 2R, 2G, or 2B functions as a display device, which displays the image of a corresponding color component. Note that although a signal input to the image processing apparatus 200 is an analog video signal in FIG. 1, a digital video signal input terminal for, e.g., LVDS or TMDS, or a D4 terminal for digital TV may be provided to input a digital video signal.

A ballast 57 is a lamp power supply connected to a lamp 1. The image processing apparatus 200 includes a power supply 58 and an AC inlet 60. A remote controller 61 is operated by a user to give various instructions to the image processing apparatus 200. A control panel 62 receives signals from the remote controller 61, and notifies a CPU 63 of them.

The CPU 63 uses computer programs and data stored in a ROM 64 to control the operation of the units of the image processing apparatus 200. The ROM 64 stores computer programs and data for causing the CPU 63 to control the operation of the units of the image processing apparatus 200 so that the units execute processes to be described later. A RAM 65 includes an area for temporarily storing various externally received data, and a work area which is used by the CPU 63 to execute various processes. That is, the RAM 65 can provide various areas as needed. A USB interface (I/F) 107 is used to communicate data with the PC 300 via a terminal 121.

Assume that the above units of the image processing apparatus 200 are connected with each other via a common bus so that they can execute data communication. The arrangement of the image processing apparatus 200 need not strictly conform to FIG. 1, as a matter of course. Any arrangement may be adopted as long as it is possible to implement the processes to be described below. This embodiment is explained on the assumption that the all units of the image processing apparatus 200 shown in FIG. 1 are configured by hardware components. It is, however, also possible to achieve the functions of the units by implementing the subframe image generation unit 103, the frame rate conversion unit 101, and the like as computer programs, storing them in the ROM 64, and then executing them by the CPU 63.

The operation of the frame rate conversion unit 101 will now be described in more detail. The frame rate conversion unit 101 divides one frame video signal into N subframe video signals. N is an arbitrary integer larger than 1. The frame rate rises by N times in accordance with the division number. In this embodiment, an example of N division will be explained in which N=2, and more specifically, a video signal having a vertical frequency of 60 Hz is converted into a signal having a vertical frequency of 120 Hz obtained by doubling the vertical frequency of 60 Hz. At this time, input image data of at least one frame is stored in the memory 33. By changing the speed of reading out image data from the memory 33, the input video signal can be transformed into a video signal having a different frame rate.

Figure 2:
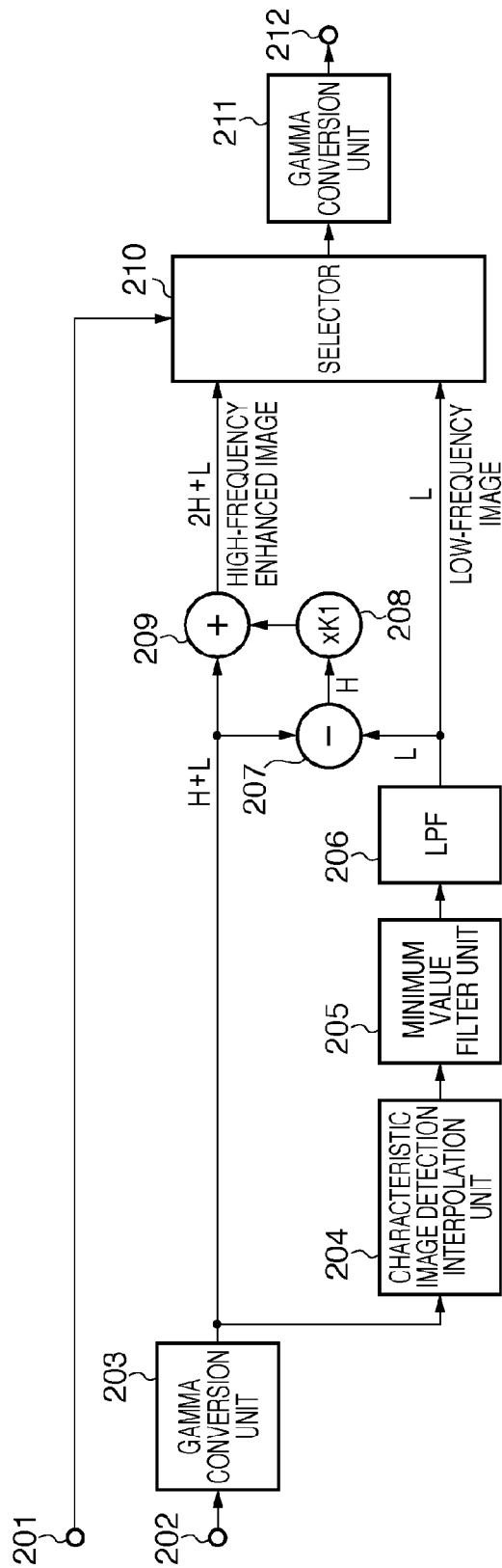
FIG. 2 is a block diagram showing an example of the functional arrangement of a subframe image generation unit 103.

With reference to FIG. 2, an example of the functional arrangement of the subframe image generation unit 103 and its operation will be explained next.

The image data sent from the frame rate conversion unit 101 is input to an input terminal 202, and then input to a gamma conversion unit 203 via the input terminal 202. The gamma conversion unit 203 performs gamma conversion with a power of 2.2 on the image data input via the input terminal 202 to convert it into image data with a linear gamma characteristic.

A characteristic image detection interpolation unit 204 executes processing of increasing the luminance value in a low-luminance area by interpolating the low-luminance area, by using its surrounding area, which is partly present in an image (input image) indicated by the image data converted by the gamma conversion unit 203. For example, in order to remove a characteristic image such as an isolated point or fine line from the input image, the unit 204 interpolates the area of the characteristic image by using its surrounding area.

A minimum value filter unit 205 performs minimum value filter processing on an image indicated by the image data which has been subjected to interpolation processing by the characteristic image detection interpolation unit 204. As is well known, the minimum value filter processing detects a minimum pixel value (luminance value) in a pixel area including a pixel of interest and a group of neighboring pixels. The processing then updates the pixel value of the pixel of interest with the detected pixel value. Performing this processing by setting each pixel of the image as a pixel of interest enables the minimum value filter unit 205 to execute the minimum value filter processing on the whole image.

A low-pass filter (LPF) 206 performs low-pass filter processing using a low-pass filter such as a Gaussian filter on the image data which has been subjected to the minimum value filter processing by the minimum value filter unit 205. This makes is possible to generate a low-frequency component image (L) in which high-frequency components have been cut. The low-pass filter 206 sends the generated low-frequency component image to a subsequent selector 210 and a subtracter 207.

The subtracter 207 subtracts the low-frequency component image (L) generated by the low-pass filter 206 from the input image (H+L) converted by the gamma conversion unit 203, thereby generating a high-frequency component image (H).

A coefficient multiplier 208 adjusts the luminance value of each pixel of the high-frequency component image by multiplying the high-frequency component image (H) generated by the subtracter 207 by a predetermined coefficient K1, and sends the adjusted high-frequency component image to an adder 209.

The adder 209 composites the input image (H+L) converted by the gamma conversion unit 203 and the high-frequency component image whose luminance values have been adjusted by the coefficient multiplier 208, thereby generating a high-frequency component enhanced image (2H+L). That is, the high-frequency component enhanced image can be obtained by adding the luminance values of the high-frequency component image to the input image (H+L) by a preset ratio (K1).

The selector 210 alternately selects the high-frequency component enhanced image (2H+L) generated by the adder 209 and the low-frequency component image (L) generated by the low-pass filter 206 in accordance with a switching signal input from the timing detection unit 132 via a terminal 201. The switching period is 120 Hz. The selector 210 then sends the selected image to a subsequent gamma conversion unit 211. The gamma conversion unit 211 performs gamma conversion on the image output from the selector 210 as needed, and sends a resultant video signal to the polarity inversion unit 106 via a terminal 212.

A video signal (image data) which varies during processing executed by the subframe image generation unit 103 will be described next using FIGS. 3A to 3E. Charts shown in FIGS. 3A to 3E respectively show the waveforms of video signals for one line in the horizontal direction. Assume that the background is black (a luminance signal level=0) and the foreground is white (a luminance signal level=100).

Figure 3A:
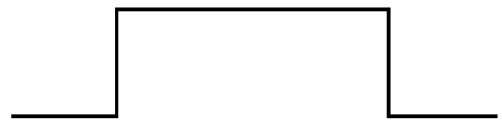
FIGS. 3A to 3E are charts showing examples of the waveform of a video signal.

A video signal having the waveform shown in FIG. 3A does not include a characteristic image such as an isolated point or fine line. When the video signal is input, therefore, the characteristic image detection interpolation unit 204 outputs a video signal having the same waveform as that shown in FIG. 3A, as shown in FIG. 3B.

Figure 3B:
Figure 3C:
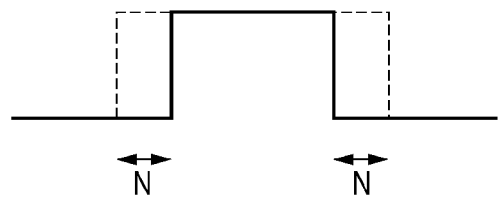

When the video signal having the waveform shown in FIG. 3B is input, the minimum value filter unit 205 outputs a video signal having the waveform shown in FIG. 3C. As described above, the minimum value filter processing executed by the minimum value filter unit 205 detects a minimum luminance value from a pixel of interest and a group of neighboring pixels (N pixels around the pixel of interest), and replaces the luminance value of the pixel of interest with the detected luminance value. Consequently, an area having a low luminance level spreads.

Figure 3D:
Figure 3E:
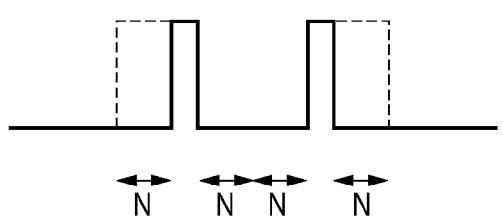

A case in which a video signal including a characteristic image such as an isolated point or fine line is input to the characteristic image detection interpolation unit 204 will be explained next. The video signal including a characteristic image such as an isolated point or fine line has a waveform in which an area having a low luminance level is partly present in an area having a high luminance level, as shown in FIG. 3D. Assume that the characteristic image detection interpolation unit 204 is omitted from the image processing apparatus 200, and the video signal having the waveform shown in FIG. 3D is input to the minimum value filter unit 205. In this case, as shown in FIG. 3E, a video signal having a waveform in which the area having the low luminance level spreads is output.

In this embodiment, even if the video signal having the waveform shown in FIG. 3D is input, it is possible to solve the above problems since the characteristic image detection interpolation unit 204 detects a luminance difference between a pixel of interest and its neighboring pixels, and corrects and removes the area having a low luminance level. That is, it is possible to prevent a minute black area shown in FIG. 3D from spreading due to the minimum value filter processing.

This embodiment has an advantage that a characteristic point remains in the high-frequency component enhanced image without correction. This, therefore, makes it possible to improve only a defect in a characteristic point for a minimum value filter without degradation such as a loss of a characteristic image in an image finally displayed.

The above-mentioned processes executed by the image processing apparatus 200 will be explained with reference to FIG. 6 which shows a flowchart of the processes. Note that the processes are as described above, and will be briefly explained here.

In step S601, as described above, for a video signal input via the switch 30, the A/D converter 31 and the DSP 32 perform video signal conversion into a digital video signal and various image processes on the digital video signal, respectively.

In step S602, the frame rate conversion unit 101 converts the frame rate of the video signal input from the DSP 32. In step S603, the gamma conversion unit 203 performs gamma conversion on image data input via the input terminal 202 to convert it into image data with a linear gamma characteristic.

In step S604, the characteristic image detection interpolation unit 204 executes processing of increasing a luminance value in a low-luminance area by performing the above interpolation processing on an image indicated by the image data converted by the gamma conversion unit 203.

In step S605, the minimum value filter unit 205 performs the minimum value filter processing on the image indicated by the image data which has been subjected to the interpolation processing by the characteristic image detection interpolation unit 204. In step S606, the low-pass filter (LPF) 206 executes the low-pass filter processing on the image data which has been subjected to the minimum value filter processing by the minimum value filter unit 205, thereby generating a low-frequency component image in which high-frequency components have been cut.

In step S607, the subtracter 207 generates a high-frequency component image by subtracting the low-frequency component image from the image converted by the gamma conversion unit 203. In step S608, the coefficient multiplier 208 adjusts the luminance value of each pixel of the high-frequency component image generated by the subtracter 207 by multiplying the high-frequency component image by the predetermined coefficient K1.

In step S609, the adder 209 composites the image converted by the gamma conversion unit 203 and the high-frequency component image whose luminance values have been adjusted by the coefficient multiplier 208, thereby generating a high-frequency component enhanced image.

In step S610, the selector 210 alternately selects, in accordance with a switching signal, the high-frequency component enhanced image generated by the adder 209 and the low-frequency component image generated by the low-pass filter 206, and sends the selected image to the gamma conversion unit 211. The gamma conversion unit 211 performs gamma conversion on the image output from the selector 210 as needed, and sends a resultant video signal to the polarity inversion unit 106 via the terminal 212.

In step S611, of the video signal subjected to the processing by the polarity inversion unit 106, the D/A converter 35, and the panel driver 36, an R component video signal, a G component video signal, and a B component video signal are respectively sent to the panels 2R, 2G, and 2B.

Second Embodiment

In the first embodiment, the characteristic image detection interpolation unit 204 interpolates a low-luminance area, by using its surrounding area, which is partly present in an image indicated by a video signal converted by the gamma conversion unit 203, thereby increasing the luminance value in the low-luminance area. In the second embodiment, as another method for increasing the luminance value in a low-luminance area, a low-pass filter is used. That is, in the second embodiment, a low-pass filter is used instead of the characteristic image detection interpolation unit 204.

Figure 4:
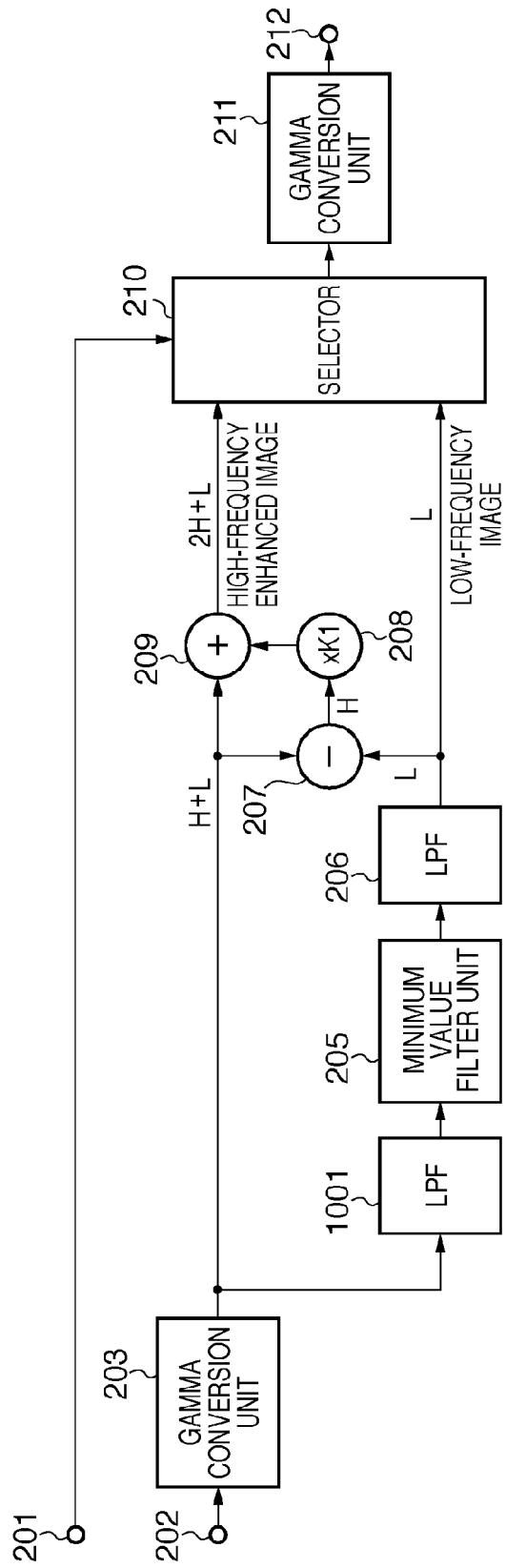
FIG. 4 is a block diagram showing an example of the functional arrangement of a subframe image generation unit 103.

In this embodiment, therefore, the arrangement of a sub-frame image generation unit 103 is the same as in the first embodiment except that a low-pass filter 1001 is substituted for the characteristic image detection interpolation unit 204, as shown in FIG. 4. The low-pass filter 1001 performs low-pass filter processing on a video signal converted by a gamma conversion unit 203, thereby increasing the luminance value in a low-luminance area.

Figure 5A:
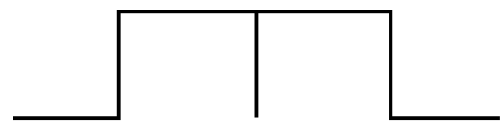
FIGS. 5A to 5C are charts showing examples of the waveform of a video signal.
Figure 5B:
Figure 5C:
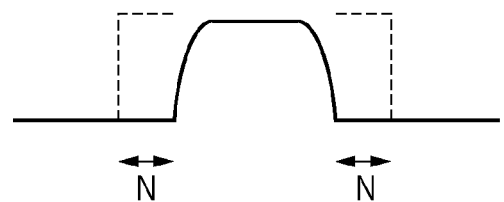

If a video signal having a waveform, in which an area having a low-luminance level is partly present in an area having a high-luminance level as shown in FIG. 5A, is input to the low-pass filter 1001, the low-pass filter 1001 increases the luminance value in the low-luminance area as shown in FIG. 5B. If a video signal having a waveform shown in FIG. 5B is input to a minimum value filter unit 205, the minimum value filter unit 205 prevents a minute black area from spreading due to minimum value filter processing, as shown in FIG. 5C.

According to the above embodiments, even when a moving image characteristic such as moving image blurring is improved, display taking full advantage of the dynamic range of display tones is possible without losing high-frequency components. This makes it possible to improve a moving image characteristic without deterioration of the image quality by a characteristic image such as an isolated point.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-232864 filed Oct. 6, 2009, which is hereby incorporated by reference herein in its entirety.

What is claimed is:

1. An image processing apparatus comprising:
   a correction unit which increases a luminance value in a low-luminance area that is partly present in an input image, by interpolating the low-luminance area using its surrounding area;
   a filter unit which generates a low-frequency component image by executing minimum value filter processing on an image corrected by said correction unit and then performing low-pass filter processing on the image subjected to the minimum value filter processing;
   an unit which generates a high-frequency component image by subtracting the low-frequency component image from the input image;
   an unit which generates a high-frequency component enhanced image by adding a luminance value of the high-frequency component image to the input image according to a preset ratio; and
   an output unit which alternately outputs the low-frequency component image and the high-frequency component enhanced image.

2. The apparatus according to claim 1, wherein the input image is an image which is represented by a video signal with a linear gamma characteristic and is obtained by performing gamma conversion on an externally input image.

3. The apparatus according to claim 1, wherein said output unit performs gamma conversion on the image to be output, and then outputs the image subjected to the gamma conversion.

4. The apparatus according to claim 1, wherein said output unit outputs an image to a display device.

5. An image processing method comprising:
   a correction step of increasing a luminance value in a low-luminance area which is partly present in an input image, by interpolating the low-luminance area using its surrounding area;
   a filter step of generating a low-frequency component image by executing minimum value filter processing on an image corrected in the correction step and then performing low-pass filter processing on the image subjected to the minimum value filter processing;

a step of generating a high-frequency component image by subtracting the low-frequency component image from the input image;

a step of generating a high-frequency component enhanced image by adding a luminance value of the high-frequency component image to the input image according to a preset ratio; and an output step of alternately outputting the low-frequency component image and the high-frequency component enhanced image.

* * * * *